April 24, 1934.  H. RICCI  1,956,105
SIREN
Filed July 6, 1933   2 Sheets-Sheet 1
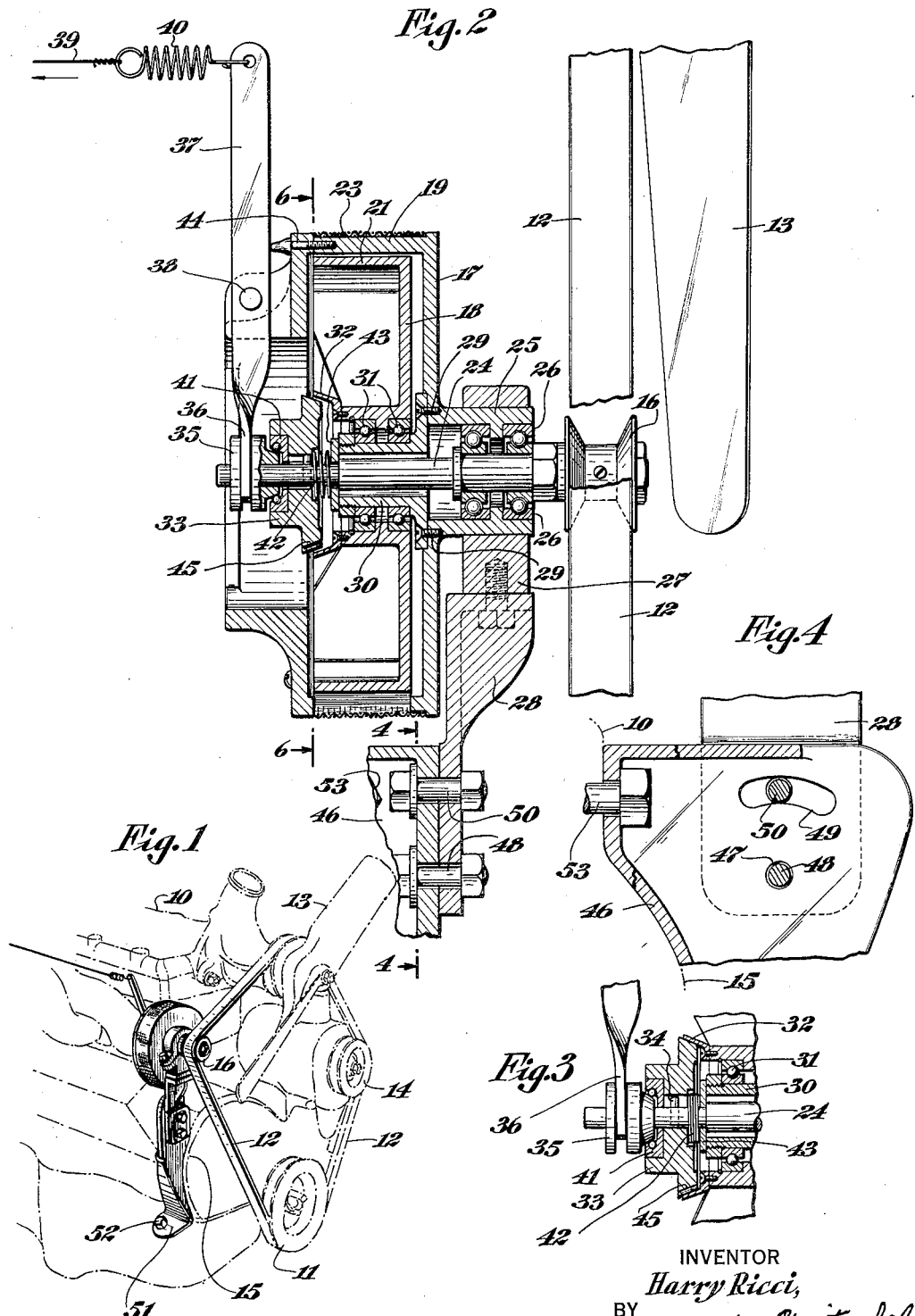

April 24, 1934.  H. RICCI  1,956,105
SIREN
Filed July 6, 1933  2 Sheets-Sheet 2

INVENTOR
Harry Ricci,
BY
Frederick Breitenfeld
ATTORNEY

Patented Apr. 24, 1934

1,956,105

UNITED STATES PATENT OFFICE 1,956,105

SIREN

Harry Ricci, Staten Island, N. Y.

Application July 6, 1933, Serial No. 679,177

5 Claims. (Cl. 116—147)

My present invention relates generally to signaling devices, and has particular reference to sirens of the character which are used on police cars or the like.

A siren of the type which is used in motor vehicles consists essentially of a stator and a complementary rotor, these parts being provided with peripheral apertures of a predetermined character which cause a characteristic sound to be produced when the rotor rotates with relative rapidity with respect to the stator. The customary manner of associating these sirens with motor vehicles, for example, police cars or the like, has been to mount the siren in a pivotable manner adjacent to a constantly rotating part or element of the motor, and to pivot the entire siren, when operation is desired, to bring a driving pulley or the like into operative driving relationship with said part or element. It has been usual practice to replace the ordinary fan and fan belt of the motor with a specially constructed fan adapted to be driven by a special fan belt engaging the fan around the periphery. The siren is then provided with a driving pulley or the like which is brought into contact with this special fan belt whenever operation of the siren is desired.

Constructions of the foregoing character are not only relatively expensive, but require considerable time and labor in the installation thereof, not to mention the extra and special parts that have to be furnished. Furthermore, the mounting of a siren in a pivotable manner requires considerable space.

The space available to the siren designer is, of course, limited by the relative arrangement of the motor within the hood of the motor vehicle. With the advent of modern stream-line vehicles, the available space beneath the hood of the ordinary motor vehicle has become so small that the ordinary type of siren can usually no longer be accommodated.

It is a general object of my present invention to provide a siren construction which is not only light in weight and relatively inexpensive to manufacture and install, but which is extremely compact both in structural nature and in mode of operation, whereby it may be efficiently associated with motor vehicles of the present-day type, especially those in which the vehicle manufacturer has arranged the hood of the motor in relatively close relationship to the motor and associated parts within the hood.

A more specific object of my invention is to provide a construction whose installation and operation requires no replacement of the conventional fan or fan belt of the motor. This is an important advantage, in itself, because certain modern types of motor vehicle constructions make it difficult, if not impossible, to effect the kind of replacement that would be necessary for the installation of the ordinary type of siren.

A further object of my invention is to provide a siren construction which requires for operation no pivotal movement of the siren as a whole, and no corresponding make-and-break of a driving connection with the fan belt. More particularly, it is a feature of my present invention to provide a siren in which a driving shaft is permanently associated, in driving relationship, with the ordinary conventional fan belt of the motor.

Various attempts have been made in the past to produce sirens in which the driving shaft is constantly rotated, and in which the operation of the siren is caused to be controlled independently of the starting and stopping of such driving shaft. I, myself, have heretofore successfully constructed a siren in which the stator is axially shiftable with respect to the rotor, the latter being maintained in a state of constant rotation. This type of construction requires considerable space, however, and by means of my present invention I have accomplished the same general objective in a manner which is, from many aspects, more advantageous and simple.

Briefly, my present invention provides for a stator and rotor arranged in permanent relationship, the rotor being loosely mounted on a constantly rotated driving shaft, and a clutch element being splined to the driving shaft and controllable from a relatively remote point. The control of the clutch element permits the latter to be engaged and disengaged at will with respect to a complementary element on the rotor of the siren, thereby controlling the initiation and discontinuance of siren operation during maintained rotation of the driving shaft.

A particular feature of my invention lies in providing an adjustable attachment clamp which is carried by the stator of the siren and which is adapted to secure the latter in proper permanent relationship to the housing of the motor with which the siren is to be associated. By choosing the proper type of attachment clamp, and by suitably adjusting it during installation, a siren of the present character may be efficiently and compactly associated with almost any motor of present-day type, without requiring any costly replacement of standard motor parts, and without in the least impairing the efficient manner of operating the siren. As a matter of fact, a siren of the present character is simpler in nature, less expensive to manufacture, easier to install, and more efficiently controllable than any siren of conventional character and comparable capacity heretofore used for the same general purpose.

I achieve the foregoing objects, and such other objects as may hereinafter appear or be pointed out, in the manner illustratively exemplified in the accompanying drawings, wherein—

Figure 1 is a perspective view of a siren of the present type shown in association with a typical modern automotive vehicle motor;

Figure 2 is an enlarged, longitudinal, cross-sectional view through the present type of siren, this view being taken substantially along the line 2—2 of Figure 5;

Figure 3 is a fragmentary view of a portion of Figure 2, showing the clutch in engagement with the rotor;

Figure 4 is a fragmentary, cross-sectional view taken substantially along the line 4—4 of Figure 2;

Figure 5:
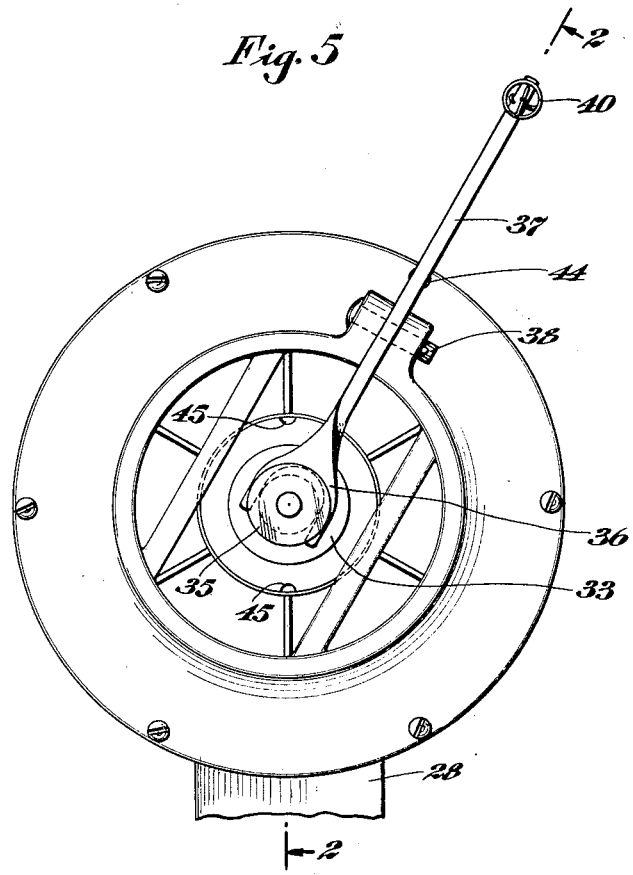
Figure 5 is a view taken from the left of Figure 2.

In Figure 1, I have shown a typical motor 10 of the type which is found in modern automobiles. At the forward end of the crank shaft I have shown the usual pulley 11 which is permanently connected, by means of the fan belt 12, with the fan 13 for the purpose of driving the latter. I have also shown this belt engaging around a pulley 14 for operating the generator.

In the type of motor illustrated, the motor housing includes a substantially circular portion 15 which encloses the timing gear and shaft, and it is convenient to mount the present siren to this portion of the housing so as to position the siren proper substantially above this portion. The present siren is provided with a driving shaft, which will be presently described, upon the end of which a pulley 16 is mounted; and it is a relatively simple matter either to stretch the fan belt 12 over this pulley or to substitute a slightly longer fan belt for the one which is furnished by the manufacturer of the vehicle. In any event, the present siren, when completely installed in a motor of the type shown, assumes the relationship of Figure 1, and it is to be observed that it is securely attached to the motor housing in an unpivotable and immovable manner, with the fan belt 12 permanently engaging around the pulley 16 so that the driving shaft of the siren is caused to rotate continuously whenever the motor 10 operates.

Figure 6:
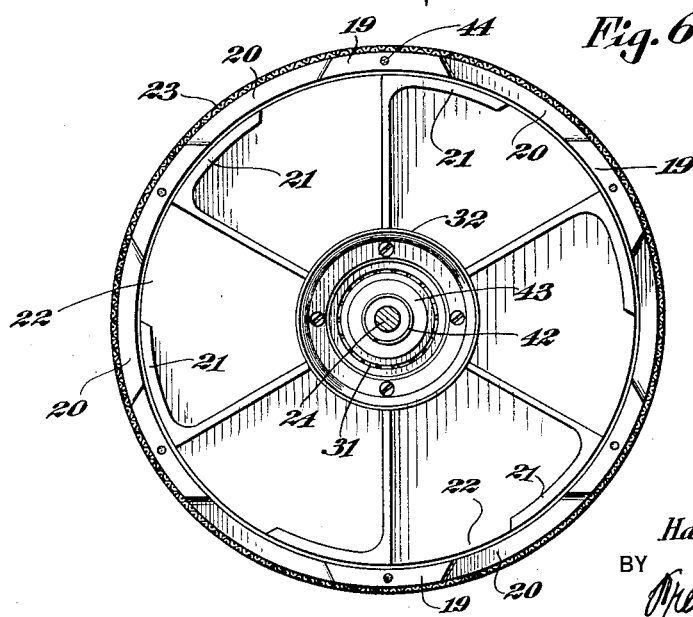
Figure 6 is a cross-sectional view taken substantially along the line 6—6 of Figure 2.

Referring now to Figures 2, 5, and 6, it will be observed that the siren consists essentially of the circular stator 17 and the complementary rotor 18. The peripheral wall 19 of the stator is provided with apertures or openings 20, and the corresponding wall 21 of the rotor is provided with complementary apertures or openings 22, whereby rapid rotation of the rotor produces the characteristic signaling sound. Preferably, the peripheral wall 19 is completely enclosed in a protective netting or screen 23.

In accordance with my present invention, the driving shaft 24 of the siren is journaled axially in the stator 17, and the rotor 18 may be said to be loosely mounted on this shaft. More particularly, the driving shaft 24 is journaled in the hub portion 25 of the stator, preferably by means of the anti-friction bearings 26. The hub portion 25 is firmly engaged within a pillow-block 27, which is in turn secured to the bracket 28, the latter being secured to the motor housing by means of an adjustable attachment clamp hereinafter to be described in greater detail.

Carried by the stator on its interior, as by means of the studs 29, is a tubular supporting member 30 on which the rotor is rotatively mounted, preferably through the intermediary of the anti-friction bearings 31. The sleeve or tube 30 is coaxial with respect to the shaft 24, and the rotor is thus coaxially mounted with respect to the stator. Since it is not connected with the shaft 24, and is not in permanent driving relationship to the shaft 24, the rotor may be said to be loosely mounted on this shaft, although it will be obvious that this is not strictly the case in the embodiment illustrated.

In accordance with my present invention, the rotor is adapted to be brought into and out of instantaneous engagement with the constantly rotating driving shaft 24, at will, thereby enabling an instantaneous control of the initiation and discontinuance of siren operation. I accomplish this by securing a female clutch disc 32 on the end of the hub portion of the rotor, and by providing a complementary clutch disc 33 splined to the shaft 24. The manner in which this splined relationship may be accomplished is optional, and I have illustratively shown a pin or key 34 mounted in the shaft 24 and engaging with a longitudinal slot in the hub of the clutch disc 33.

At the rear of the clutch proper is a grooved collar 35 which is loosely mounted upon the shaft 24 and which is engaged by a yoke 36 formed on the inner end of a lever 37. This lever is pivoted, as at 38, to the stator 17, and is articulated at its free end with a control element or rod 39 which extends rearwardly into an accessible position within the vehicle, preferably at the dashboard. Between the forward end of the element 39 and the end of the lever 37, I prefer to arrange a spring 40 for obvious reasons.

Between the collar 35 and the clutch disc 33, I provide a roller bearing 41 which permits the clutch disc to rotate freely with the shaft 24 without an undue amount of friction between it and the collar 35.

Between the inner face of the clutch disc 33 and the end of the tubular supporting member 30, I provide a compression spring 42, adapted to bear against the washer 43 and tending constantly to hold the clutch disc away from the rotor in substantially the position shown in Figure 2.

The mode of operation of the siren will be obvious from the description given. The belt 12 constantly drives the pulley 16 and the shaft 24 as long as the motor 10 is operating. The clutch disc 33 rotates with the shaft and is normally held in retracted relation to the rotor by means of the spring 42. The amount of retraction is limited by the fact that the lever 37 bears against the outer end of the stud 44, the latter thereby serving as a stop abutment. When the siren is to be operated, it is merely necessary to pull the element 39 in the direction of the arrow of Figure 2, whereby the collar 35 is forced toward the right, as viewed in Figure 2, thereby forcing the clutch disc 33 into driving relation with the female clutch disc 32. Since the entire rotor 18 is composed of very light material, preferably aluminum or the like, and since it is freely rotatable by virtue of the bearings 31, the rotor partakes of the speed of the clutch disc 33 in a fraction of an instant; and, as a result, the characteristic siren signal is produced almost instantaneously.

The signal continues as long as the clutch element 33 is held in engagement with the rotor. When the signal is to be discontinued, the element 39 is released and the spring 42 immediately disengages the clutch elements. If desired, a brake arrangement could be associated with the lever 37 for engaging the rotor 18 whenever the clutch is disengaged from the rotor; but even without such a brake, the disengagement of the rotor causes the sound to stop almost immediately, although the rotor itself may continue to rotate for a considerable period before it comes to rest.

The amount of movement of the clutch disc 33 from the inoperative position of Figure 2 into the operative position of Figure 3 is extremely slight, as will be obvious upon comparing these figures. Accordingly, there is a minimum likelihood of wear and tear, and the mode of operation is thus rendered as efficient as the entire siren construction itself. No additional space is required for moving parts or for the adjustment of parts during initiation and discontinuance of siren operation. The entire siren, when once installed, remains stationary, and may thus be fitted with ease into the small available space which is afforded therefor by modern motor vehicle construction.

Preferably, the operative surface of the clutch disc 33 is provided with one or more semi-circular recesses 45, as shown most clearly in Figure 5. The edges of these recesses serve as scrapers to keep the female disc 32 always in a clean condition ready for firm and efficient engagement by the rotating clutch face. In other words, any slight amount of dust or grease that might work its way between the operative clutch faces during periods of rest of the siren are immediately and automatically removed as soon as the element 33 is brought into engagement with the disc 32.

An important feature of my invention, arising directly from the particular problems which my invention seeks to overcome, is the manner in which the stator 17 may be efficiently secured in position with respect to a motor housing of the type shown in Figure 1. The pillow-block 27 and the bracket 28 are standard parts manufactured with each siren and assembled with the stator, rotor, and clutch at the time of manufacture. The actual attachment of the siren to a motor housing (and by this term I mean to include also available and convenient portions of the chassis itself) is accomplished by means of an adjustable clamp or plate 46 which is provided with the aperture 47, for receiving the stud 48, and the arcuate aperture 49 which is adapted to receive the stud 50. The plate or clamp 46 is a special element constructed to conform to specific makes and types of motor vehicles, since the available areas of attachment are not the same in different types and makes of different automobiles. In the illustrated embodiment, for example, the clamp 46 is provided with a curved portion which conforms to the curvature of the housing portion 15, and with an attachment lug 51 adapted to accommodate the stud 52 which helps to secure the clamp to the motor housing. The clamp plate 46 is so constructed and shaped that the stud 52 may be one of the studs entering into the motor assembly itself. A corresponding attachment lug is provided adjacent to the upper edge of the clamp 46, and here again the element 46 is so constructed that the attachment stud 53 is one which forms an original part of the motor construction.

As a result of the foregoing manner of constructing the present device, it is a relatively simple matter to apply the proper attachment clamp 46 to the bracket 28; then to adjust this clamp 46 to the particular motor housing with which the siren is to be associated; and to secure the siren in position by simply withdrawing and then replacing one or more studs of the type shown at 53, these studs forming original parts of the motor construction itself. The fan belt is then stretched around the pulley 16, or a substitute fan belt is applied which embodies the proper length. The studs 48 and 50 are then tightened, and an arcuate adjustment may be made by means of the slot 49 to permit proper tension to be embodied in the fan belt when the siren is finally located in position. The control element 39 is then easily brought rearwardly into an accessible control position within the vehicle, and the entire installation is thus completed.

I am aware of clutching and declutching arrangements per se for a variety of moving parts of various machines, a clutch, as such, being, of course, old in the art. I believe, however, that a clutch arrangement of the present type, associated with a siren of the present character, and in the manner herein illustrated and described, is new in the art of manufacturing and installing sirens in motor vehicles; and it is only by means of my present manner of associating the several parts, including the clutch, that a siren of the present type may be successfully and efficiently associated with motor vehicles of present-day style.

It will be obvious that changes in the details herein described and illustrated, for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In a siren, a stator, a driving shaft journaled axially in said stator, a complementary rotor loosely mounted on said shaft, a clutch disc splined to said shaft, and means for engaging and disengaging said clutch disc with respect to said rotor, thereby controlling instantaneous initiation and discontinuance of siren operation during maintained rotation of said shaft.

2. In combination with the motor of a motor vehicle, a siren comprising a stator secured to the housing of said motor, a driving shaft journaled axially in said stator, means permanently connecting said shaft and motor in driving relationship, a complementary rotor loosely mounted on said shaft, a clutch disc splined to said shaft, and means for engaging and disengaging said clutch disc with respect to said rotor, thereby controlling instantaneous initiation and discontinuance of siren operation during maintained rotation of said shaft.

3. In combination with the motor of a motor vehicle, said motor including a fan and a fan belt, a siren comprising a stator secured to the housing of said motor, a driving shaft journaled axially in said stator, a pulley on said shaft permanently engaging said fan belt in driving relationship, whereby said shaft rotates continuously when the motor operates, a complementary rotor loosely mounted on said shaft, a clutch disc splined to said shaft, and means for engaging and disengaging said clutch disc with respect to said rotor, whereby siren operation may be instantaneously initiated and discontinued by means of said clutch disc.

4. In combination with the motor of a motor vehicle, said motor including a fan and a fan belt, a siren comprising a stator secured to the housing of said motor, a driving shaft journaled axially in said stator, a pulley on said shaft permanently engaging said fan belt in driving relationship, whereby said shaft rotates continuously when the motor operates, a complementary rotor loosely mounted on said shaft, a clutch disc splined to said shaft, and means for engaging and disengaging said clutch disc with respect to said rotor, said means comprising a lever pivoted to the stator and having one end articulated to said clutch disc, and a control element connected to the other end of the lever and extending rearwardly into an accessible control position within the vehicle.

5. A siren for attachment to the motor of a motor vehicle, comprising a stator, a driving shaft journaled axially in said stator, a pulley on said shaft and adapted to be engaged and driven by the fan belt of said motor, a complementary rotor loosely mounted on said shaft, a clutch disc splined to said shaft, means for engaging and disengaging said clutch disc with respect to said rotor, and an adjustable attachment clamp carried by the stator for securing the latter to said motor.

HARRY RICCI.